United States Patent [19]

Wekell

[11] Patent Number: 4,816,149

[45] Date of Patent: Mar. 28, 1989

[54] PORTABLE WATER FILTRATION SYSTEM

[75] Inventor: William O. Wekell, Renton, Wash.

[73] Assignee: Technique, Renton, Wash.

[21] Appl. No.: 162,484

[22] Filed: Mar. 1, 1988

[51] Int. Cl.$^4$ ............................................. B01D 23/02
[52] U.S. Cl. .................. 210/257.2; 210/311;
210/321.64; 210/321.84; 210/435; 210/470;
210/348
[58] Field of Search ...................... 210/257.2, 308, 309,
210/311, 321.6, 321.64, 321.84, 321.87, 435, 470

[56] References Cited

U.S. PATENT DOCUMENTS

| 58,530 | 10/1866 | Woodman | 210/311 |
|---|---|---|---|
| 62,696 | 3/1867 | Shickle et al. | 210/311 |
| 795,703 | 7/1905 | Jones | 210/311 |

Primary Examiner—Richard V. Fisher
Assistant Examiner—Christopher Upton
Attorney, Agent, or Firm—Mikio Ishimaru

[57] ABSTRACT

A flat, flexible, plastic container has an openable and a closed end separated by a sealed region dividing the container into a first and second chambers. The first chamber extends from the openable end to the closed end which contains a filtration assembly separating the first and second chambers. When the first chamber is positioned above the second chamber and filled with contaminated fluid, gravity draws the contaminated water from the first chamber through the filtration assembly to fill the second chamber with filtered water.

30 Claims, 1 Drawing Sheet

PORTABLE WATER FILTRATION SYSTEM

FIELD OF THE INVENTION

The present invention relates generally to fluid filtration systems and more particularly to a portable water filtration system utilizing gravity feed of water through the filter media.

BACKGROUND OF THE INVENTION

In the past, outdoorspersons had a number of techniques for providing potable water. One technique was to use waterproof canvas or plastic weighed down with rocks and placed close to the ground to condense low lying ground vapor, or dew, into a container drop by drop. Another technique was the use of a solar powered still to distill pure water from contaminated water. Both these methods were time consuming and inconvenient.

Another approach was to use chemical water purification tablets which worked by chemically generating chlorine or iodine. Again, these were time consuming and often added an unpleasant taste to the water. Further, the tablets, when used at normal or acceptable concentrations, were ineffective against protozoa.

With the increasing popularity of camping and hiking in remote wilderness areas, a better system of obtaining potable water was required. This led to the development of the pump water filtration system. In this system, a pump was connected to a filter with one tube being inserted in the potentially contaminated water and a second tube inserted into a container. By hand pumping the pump, contaminated fluid was drawn into the pump during an intake stroke and then expelled through the filter media, generally a cylindrical ceramic filter, to the second tube and to the container. These types of devices provide high volumes of water and are highly efficient in filtering action; however, because of the mechanical complexity of these types of systems, they are expensive and generally not within the reach of the casual outdoors-person. Also, these devices are intended for use over a long period of time and risk bacterial growth through the filter material from the contaminated side to the filtered side. Further, for true wilderness campers and hikers or mountaineers, they had the disadvantage of being relatively bulky for carrying in backpacks where space is at a premium.

Thus, there has been a long sought need for a water filtration system which would be fully portable in taking up a minimum volume, weighing as little as possible, and being inexpensive.

Further, a low energy input system was desired which would not require strenuous pumping or be dependent upon weather being clear enough for solar energy to do the job.

SUMMARY OF THE INVENTION

The present invention provides a fluid filtration system having a flexible container divided into a first and second chambers separated by a filtration assembly through which the fluid passes substantially under the force of gravity from the first to the second chamber.

The present invention further provides a fluid filtration system which places the filtration assembly at the lowest point of the first chamber so that gravity has the greatest effect to cause the fluid to pass through the filtration assembly.

The present invention still further provides integral portions which can be used to hang the fluid filtration system in one of two positions to empty the first or second chambers.

The present invention in addition provides for a filtration assembly which provides support for filter media while minimizing flow restriction through the filter media.

The present invention in addition also includes a trap for prventing large particles from blocking the filter media prematurely.

The present invention still further provides a provision for keeping the second chamber sealed until the filtered fluid is to be used.

The present invention additionally provides a mechanism for controlling the flow of filtered fluid out from the second chamber.

The present invention in addition provides a mechanism for minimizing the contamination of unfiltered fluid on the outside of the flexible container with the filtered fluid as it is poured from the flexible container.

The above and additional advantages of the present invention will become apparent to those skilled in the art from a reading of the following detailed description when taken in conjunction with the accompanying drawings.

DESCRIPTION OF THE PREFERRED EMBODIMENT

Figure 1:
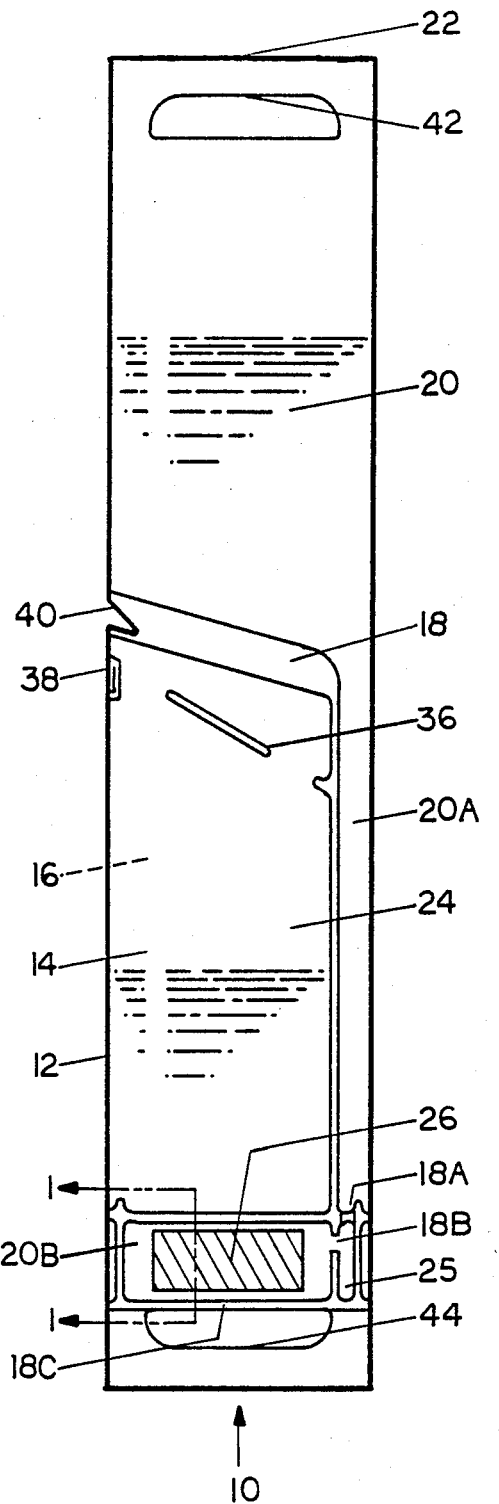
FIG. 1 is a front view of the present invention.

Referring now to FIG. 1, therein is shown the portable water filtration system 10 of the present invention. The portable water filtration system 10 consists of a flexible container 12 which in the preferred embodiment is a 0.003 inch thick wall cylindrical polyethylene sleeve which is pressed flat.

It should be noted that, since the flexible container 12 is substantially flat, it could be made from two separate flat sheets of polyethylene bonded together around its periphery. However, this is not preferred because the additional bonding is not as strong as a flattened sleeve would be.

An additional advantage of polyethylene is that it is transparent so it is easy to see the levels of water in the flexible container 12. Many other plastics could be used including those which would expose the fluid to incidental germicidal ultraviolet light.

In the flattened state, the flexible container 12 has a forward wall 14 and a rear wall 16. This may be seen best by reference to FIG. 2 which shows the walls separated as they would be when there is water in the flexible container 12.

Polyethylene is also the preferred material for the portable water filtration system 10 because it may be easily heat bonded to itself. Thus, the forward wall 14 is sealed to the rear wall 16 by the heat seal area 18 which divides the flexible container 12 into a first chamber 20 which is normally closed flat but is openable at opening 22, and a second chamber 24.

The first chamber 20 is connected via a narrow portion 20A to openings in the heat seal 18 at openings 18A and 18B to the second chamber 24. Near the opening 18B is a pocket area which defines a sediment trap 25.

The opening 18B leads into a further portion of the first chamber 20 designated as 20B. The flexible container 12 is closed by the heat seal area 18C.

A filtration assembly 26, which will hereinafter be described, separates the first chamber 20 from the second chamber 24, and is positioned parallel to the portion 20B of the first chamber 20.

Figure 2:
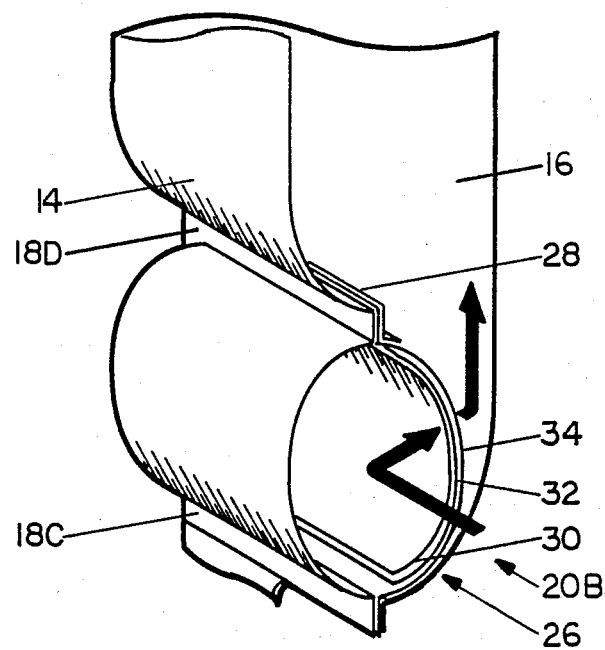
FIG. 2 is an enlarged isometric view of section 1—1 of FIG. 1 in its operative position.

Referring now to FIG. 2, therein is shown an enlarged section 1—1 which is a cross section of FIG. 1 with arrows representing the direction of water flow through the portion 20B, the filtration assembly 26, and the second chamber 24. In FIG. 2, it may be seen that the forward wall 14, the filtration assembly 26, and the rear wall 16 are bonded together at heat seal area 18C. The forward wall 14 is bonded to the top of the filtration assembly 26 at heat seal area 18D. However, a heat resistant tape 28 of incompatible polymer rearward of a portion of the filtration assembly 26 prevents the heat sealing of the filter assembly 26 to the rear wall 16. This tape 28 is used in manufacturing the filtration system 10 to control the locations where heat bonding is not to occur.

The filtration assembly 26 could be a single filter which could be bonded directly to the flexible container 12, but in the preferred embodiment it consists of a planar fiberglass prefilter 30 over a planar permeable submicron filter media 32 which is sealed to a filter support film 34 of polyethylene.

Figure 3:
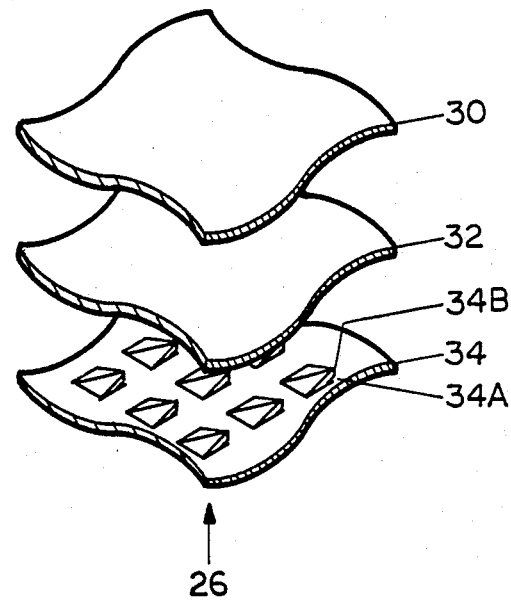
FIG. 3 is an enlarged exploded view of a portion of the present invention.

Referring now to FIG. 3, therein is shown a blowup of the filtration assembly 26 with the prefilter 30, the filter media 32 and the filter support film 34. The filter media 32 is sealed to the filter support film 34 so water can only pass perpendicularly through the filter media 32 and not around it. The filter support film 34 has provided therein perforations 34A of a roughly pyramidal form having points or peaks 34B which engage the filter media 32 in such a manner as to hold it in place and allow minimal restriction to water passing from the first chamber 20 to the second chamber 24. It has been found that the pyramidal configuration provides maximum support to the filter media 32 while not collapsing under the force of water passing through the filter media 32. In the preferred embodiment, the point to point distance is about 0.040 inch. The filter support film 34 is required because most filter media tend to be delicate materials which can be easily torn or shredded.

Referring again to FIG. 1, therein is also shown an angled heat sealed rib 36 which acts as a pour guide and expansion restrictor for water being poured from the flexible container 12. The closed end distal portion of the pour guide rib 36 is directed to a weakened area 38 similar to those on condiment pouches which is tearable to open the second chamber 24 for emptying. While a tear-off tab such as used on fruit juice containers could be used to allow opening of the second chamber 24, the provision of weakened area allows the second chamber 24 to be kept totally sterile and further serves to minimize manufacturing cost.

Above the weakened area 38 which is openable to allow the exit of filtered water, there is a drip protector which is a small cutout relief. The drip protector 40 prevents any water which is on the outside of the flexible container 12 from dripping down to the weakened area 38 and contaminating the water coming therethrough.

The flexible container 12 may be provided with a number of means for hanging it in a vertical position with either the first chamber 20 or the second chamber 24 disposed on top. In the preferred embodiment, the flexible container 12 is cut out at the openable end 22 to provide a hanger handle 42 and is cut out at the heat sealed end 18C with a pour handle 44.

To use the portable water filtration system 10, an outdoorsperson would open the openable end 22 and let water from a water source such as a potentially contaminated mountain stream or lake enter the first chamber 20. Ideally, the water would be taken from a falling stream of water to keep outside contamination to a minimum, but total immersion filling would be acceptable if the contaminated water were permitted to drip off. The first chamber 20 would typically hold about two quarts of water.

The outdoorsperson would then hang the flexible container 12 on a tree using the hanger handle 42. With the first chamber 20 above the second chamber 24, gravity would cause water to flow through the portion 20A of the first chamber 20 and through the opening 18A. Any large particles would be trapped by the sediment trap 25. The water would then make a right angle turn and flow through the opening 18B into the area between the forward wall 14 and the prefilter 30 which is the portion 20B of the first chamber 20.

Under the force of the head of water (the weight of the volume of water) in the large portion of the first chamber 20 which is maximized in this portable water filtration system 10, gravity will feed, or force, water through the prefilter 30, the filter media 32, and the filter support film 34 as shown by the arrows in FIG. 2.

In the preferred embodiment, the prefilter 30 will pick up medium sized particles missed by the sediment trap 19. While a 0.20 micron filter media would filter out all organisms but virus in the water, it would be a slow process. With a 0.45 micron filter media 32, pathogenic bacteria and protozoa such as *Gardia lamblia, Vibrio cholera,* and *Salmonella typhosa* will be filtered out. For specific applications, such as to remove cysts, flakes, or parasite host snails, even a 5 micron filter media would be acceptable.

With a full two quarts of water in the first chamber 20, it will take approximately two minutes for one cup of water to start filling the second chamber 24 which also has a two quart capacity. The length of time it takes to fill the second chamber 24 is a function of how much water has been previously filtered through the filter media 32 and the level to which the second chamber 24 is filled. As the second chamber 24 is filled, the back pressure from the head of water reduces the pressure differential between the first and second chamber 20 and 24 to slow down the filtration process.

It should be noted that another advantage of having the flexible container 12 is that the first chamber 20 can be squeezed to assist gravity and speed up the water flow through the filtration assembly 26.

As would be evident to those skilled in the art, the force of water from a faucet or well-water pump could also assist filtration, as could the application of a vacuum to the walls of the second chamber 24 if the filtration is being performed in a laboratory.

While the flexible container 12 is hanging in a position with the first chamber 20 above the second chamber 24, any contaminated water which collects on the outside will flow down to the drip protector 40 and off the sides of the flexible container 12.

Once the second chamber 24 has reached the desired level as can be seen through the transparent walls 14 and 16, the outdoorsperson would tear open the weakened area 38 and use the pour handle 44 to invert the flexible container 12 to drain the second chamber 24.

It has been determined that with polyethylene and other flexible materials, the flexible container 12 will tend to collapse around the weakened area 38 preventing a smooth flow of water out of the second chamber 24. By addition of the pour guide rib 36, it is possible to direct the flow and prevent the collapse of the opening 38.

By the use of a high temperature plastic which seals way above the boiling point of water, the entire portable water filtration system 10 could be dumped into a port of hot water to be field sterilized before reuse.

Due to the flexibility of the polyethylene, it is possible to collapse the flexible container 12 and fold it until it occupies a volume having the area of approximately the filtration assembly 26 and a thickness of about ¼ inch. The portable water filtration system 10 weighs only one ounce and can be made inexpensively enough to be disposable after a single use.

As many possible embodiments may be made of the invention without departing from the scope thereof. It is to be understood that all matters set forth herein or shown in the accompanying drawings are to be interpreted in an illustrative and not a limiting sense.

I claim:

1. A liquid filtration system comprising:
a flexible container having an openable end for the entry of liquid therein and a closed end and connected thereto preventing the exit of liquid therefrom, said flexible container including means dividing said flexible container into a first chamber proximate said open end and a second chamber distal therefrom; and
filtration means disposed in said flexible container and secured thereto connecting said first and second chambers, said filtration means including filter means for filtering liquid passing from said first chamber to said second chamber when said first chamber is disposed above said second chamber whereby said liquid is substantially gravity fed through said filter means.

2. The invention as claimed in claim 1 wherein said filtration means is disposed proximate said closed end of said flexible container and said first chamber of said flexible container includes a portion adjacent to said second chamber and extending to said filtration means whereby liquid in said first chamber will have a maximum pressure head of liquid passing through said filter means to said second chamber when said first chamber is disposed above said second chamber.

3. The invention as claimed in claim 1 wherein said flexible container and said filtration means are substantially flat and flexible whereby said liquid filtration system is substantially the same size as said filtration means.

4. The invention as claimed in claim 1 including means disposed proximate said openable end for holding said flexible container with said first chamber above said second chamber.

5. The invention as claimed in claim 1 wherein said filtration means includes means for supporting said filter means whereby said filter means will not be shredded by the force of liquid passing therethrough.

6. The invention as claimed in claim 1 including sediment trapping means disposed proximate said filter assembly means whereby sediment in the liquid will be prevented from reaching said filter means.

7. The invention as claimed in claim 1 including openable means associated with said flexible container proximate said second chamber for opening said second chamber for the exit of liquid therefrom.

8. The invention as claimed in claim 7 including guide means disposed in said second chamber proximate said openable means for guiding the exit of liquid from said second chamber.

9. The invention as claimed in claim 7 including protector means proximate said openable means for protecting said openable means from liquid on the outside of said flexible container.

10. The invention as claimed in claim 1 wherein said flexible container is made of a high temperature material whereby said liquid filtration system is heat sterilizable.

11. A water filtration system comprising:
a flexible container having an openable end for the entry of water therein and a closed end preventing the exit of water therefrom, said flexible container having a first and second normally parallel walls sealed together to define a first and second chambers whereby said openable end is conected to said first chamber; and
filtration means disposed in said flexible container selectively sealed to said first and second walls and connecting said first and second chambers, said filtration means including filter means having a planar surface permeable to water flowing perpendicular to said planar surface passable from said first to said second chambers, said filter means normally disposed substantially parallel to said first and second walls and filtering water passing from said first chamber to said second chamber when said first chamber is disposed above said second chamber whereby said water is substantially gravity fed through said filter means.

12. The invention as claimed in claim 11 wherein said filtration means is disposed proximate said closed end of said flexible container and said first chamber of said flexible container includes a narrow portion extending to and adjacent said filtration means and parallel to the planar surface of said filter means whereby said flexible container positioned with water in said first chamber above said second chamber will have water at a maximum head pressure passing through said filter means.

13. The invention as claimed in claim 11 wherein said first and second walls are sufficiently thin and flexible to allow folding thereof to a configuration substantially the size of said filter means.

14. The invention as claimed in claim 11 including means proximate said openable end for holding said flexible container with said first chamber above said second chamber;
including opening means for opening said flexible container proximate said second chamber; and
means disposed proximate said closed end of said flexible container for holding said flexible container with said second chamber above said first chamber whereby water in said first chamber will be drawn by gravity through said filter means to said second chamber when said first chamber is above said second chamber and water in said second chamber will be drawn by gravity through said opener means when said flexible container is held with said second chamber above said first chamber.

15. The invention as claimed in claim 11 wherein said filter assembly means includes a coarse prefilter disposed parallel to said filter means and filter support means for supporting said filter means having a plurality of openings provided therein and a plurality of support points projecting therefrom.

16. The invention as claimed in claim 11 wherein said first chamber includes a narrow portion extending to said closed end of said flexible container and including sealed portions proximate thereto forming a sediment trap thereat.

17. The invention as claimed in claim 11 wherein said flexible container includes a weakened portion thereof proximate said second chamber which is openable to allow the exit of water from said second chamber.

18. The invention as claimed in claim 17 including pour guide means disposed between said first and second walls and extending longitudinally toward said weakened area to guide water in said second chamber thereto when said second chamber is held above said first chamber.

19. The invention as claimed in claim 18 including a drip protector notch in said flexible container above said weakened area to guide water away from said weakened area.

20. The invention as claimed in claim 11 wherein said flexible container is made of a high temperature plastic whereby said water filtration system may be sterilized by boiling in water.

21. A water filtration system comprising:
a flexible sleeve openable at one end for the entry of water therein and closed at the other end, said flexible sleeve configured to be substantially flat to define first and second walls, said first and second walls having heat sealed portions connecting said first and second walls to define a first and second chambers, and connecting said openable end to said first chamber; and
a substantially planar, rectangular filtration assembly having a portion bonded to said first wall and a portion bonded to said second wall to be disposed between and connecting said first and second chambers, said filter assembly including a filter permeable to liquid passable from said first chamber to said second chamber when said first chamber is disposed above said second chamber whereby said water is substantially gravity fed through said filter.

22. The invention as claimed in claim 21 wherein said filter assembly means is disposed distal from said openable end and closes said closed end of said flexible sleeve and wherein in said first chamber includes a narrow portion extending to said filter assembly and paralleling said planar filter assembly whereby water will pass through said filter means at a maximum head pressure when said flexible sleeve is positioned with said first chamber above said second chamber.

23. The invention as claimed in claim 21 wherein said flexible sleeve is foldable to a configuration substantially the size of said filter assembly.

24. The invention as claimed in claim 21 wherein said flexible sleeve is provided with handles at both ends thereof.

25. The invention as claimed in claim 21 wherein said filter assembly includes a planar coarse prefilter disposed adjacent said filter and a planar filter support film disposed opposite said prefilter, said filter support means secured to said first and second walls and having provided therein a plurality of generally rectangular holes having pyramidal portions thereof extending from said planar surface thereof.

26. The invention as claimed in claim 21 wherein said first chamber includes a narrow portion thereof extending to said filter assembly distal from said openable end to form a sediment trap at the openable end distal portion thereof.

27. The invention as claimed in claim 21 wherein said flexible sleeve has a weakened portion disposed midway between said openable and closed end and proximate said second chamber to be torn open to empty water from said second chamber.

28. The invention as claimed in claim 27 wherein said first and second walls are heat sealed together to form a bar proximate to and longitudinally directed at said weakened area to direct water thereto when said second chamber is disposed over said first chamber.

29. The invention as claimed in claim 27 including a relief in said flexible sleeve proximate the heat sealed portion dividing said first and second chambers above said weakened area for preventing water from said first chamber from reaching said weakened area.

30. The invention as claimed in claim 21 wherein said flexible sleeve is made of a heat sealable, high temperature stable polyethylene whereby said water filtration system may be sterilized by boiling in water.

* * * * *